Nov. 28, 1961     E. E. PARKER     3,010,943
COMBINATIONS OF ARYL SULFONIC ACIDS AND TRIARYL
PHOSPHITES AS CATALYSTS IN PREPARATION
OF POLYESTERS
Filed Jan. 9, 1957
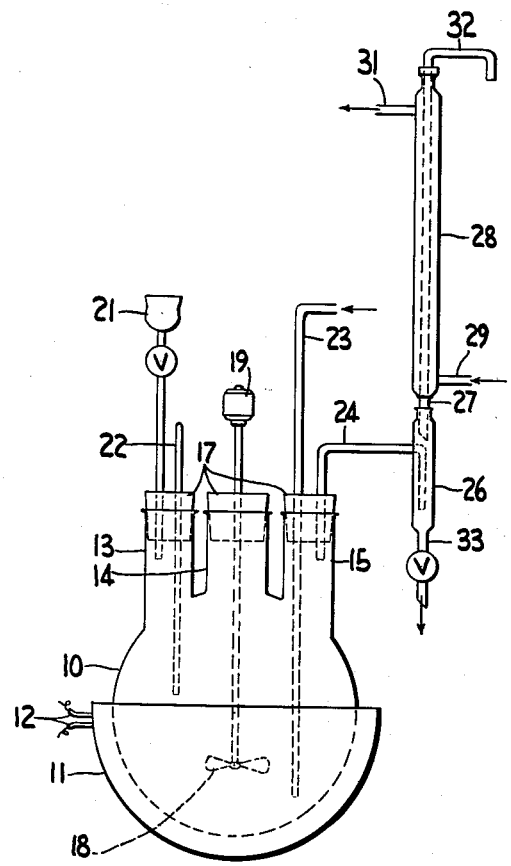
*INVENTOR.*
*EARL E. PARKER*
BY
*ATTORNEY*

United States Patent Office 3,010,943
Patented Nov. 28, 1961

3,010,943
COMBINATIONS OF ARYL SULFONIC ACIDS AND TRIARYL PHOSPHITES AS CATALYSTS IN PREPARATION OF POLYESTERS
Earl E. Parker, Allison Park, Pa., assignor to Pittsburgh Plate Glass Company, Allegheny County, Pa., a corporation of Pennsylvania
Filed Jan. 9, 1957, Ser. No. 633,295
3 Claims. (Cl. 260—75)

This invention relates to the preparation of polyesters of alcohols containing a plurality of hydroxyls and acids containing a plurality of carboxyls and it has particular relation to catalyst systems employed in effecting the esterification reaction.

Polyesters valuable for preparation of polyurethane resins and for other purposes have heretofore been prepared by the reaction of one or more alcohols containing two or more hydroxyls and a dicarboxylic acid or an anhydride thereof under such conditions as to evolve and remove water. The resultant products are long chain materials comprising the residues of the alcohol or alcohols and the acid or acids joined together by ester linkages. The reaction, when conducted at elevated temperatures and in the absence of catalysts of esterification, requires about 25 hours for attainment of a reasonable degree of completion.

In order to expedite the esterification reaction, catalyst materials such as arylsulfonic acids have been added to the reaction mixture. These catalysts considerably reduced the cooking time but still the time is relatively long. Moreover, even though such catalysts are employed, difficulty is experienced in reducing the acid value of the polyester product to an adequate degree for some purposes regardless of the amount of catalyst employed.

This invention is based upon the discovery that combinations of arylsulfonic acids and triaryl phosphites are particularly effective catalysts in the preparation of polyesters of polyhydric alcohols and polycarboxylic acids. When so employed, they produce rapid and smooth esterification. Often, reaction to obtain polyesters of low acid number takes place in much shorter time than is required to obtain corresponding acid numbers in the mixtures of the same polyhydric alcohols and polycarboxylic acids catalyzed with either an arylsulfonic acid or a triaryl phosphite taken singly.

The combination of arylsulfonic acids and triaryl phosphites of this invention may be employed in the preparation of various polyesters of various polyhydric alcohols and various polycarboxylic acids. The term "polyhydric alcohol" comprises those alcohols containing at least two hydroxyls. The lowest members of the class comprise the glycols and particularly emphasis is placed upon the glycols containing only primary hydroxyl groups and being represented by:

Ethylene glycol
Diethylene glycol
Triethylene glycol
Trimethylene glycol
Tetramethylene glycol and others. Higher polyhydric alcohols which may be employed singly or in combination with each other, or with the glycols, comprise organic compounds containing three or more hydroxyls and especially those in which the hydroxyls are primary as represented, for example, in trimethylol ethane, trimethylol propane, pentaerythritol or the like. These polyhydric alcohols containing only primary alcohol groups are deemed to be of optimum performance when esterified with polycarboxylic acid in the presence of an arylsulfonic acid and a triaryl phosphite in accordance with the provisions of this invention. However, in those instances where optimum performance is not required, the polyhydric alcohols containing secondary alcohol groups and being represented in the instance of the glycols by propylene glycol, alpha-butylene glycol, beta-butylene glycol, butane-diol-1,3, and others; and in the instance of the higher alcohols by glycerol, mannitol, sorbitol and others, may be employed. Often a dihydric alcohol and a trihydric alcohol are mixed.

The term "polycarboxylic acid" as employed herein, comprises those acids with two or more carboxyls, but from the standpoint of economy, emphasis is placed upon those acids containing but two carboxyls and being represented in the aromatic class by phthalic acid, isophthalic acid and terephthalic acid; and in the acyclic class by such open chain dicarboxylic acids as adipic acid, succinic acid, sebacic acid, azelaic acid, suberic acid and others. Mixtures of the acids may be employed with the various polyhydric alcohols and combinations of polyhydric alcohols.

The term "carboxylic acid" includes the anhydrides of the acids and indeed the anhydrides often perform better in the reaction than do the free acids from which they are derived. This is true because much of the water evolved in the esterification reaction already is eliminated from the anhydrides before the esterification reaction is started. The reaction products are still the polyesters of the acids and polyhydric alcohols.

The arylsulfonic acid employed as one component of the catalyst pair of this invention may be represented by the formula

HSO₃R where R is an aryl nucleus, as for instance those of benzene, toluene, xylene, naphthalene or the like. The various existant isomeric forms are included. Benzenesulfonic acid and p-toluene sulfonic acid are representatives of this class.

Triaryl phosphites which may be employed in combination with the arylsulfonic acids in conducting the esterification reactions of the invention comprise:

Triphenyl phosphite which presently is commercially available, tritolyl phosphite as its ortho, meta, or para isomers or mixtures of any two or three of these isomers, trianisoyl phosphite and others such as may be prepared by the conventional techniques may be employed in preparing triaryl phosphites.

In proportioning the various reactants employed in the preparation of the polyesters, the polyhydric alcohol most usually will be employed at least in substantial equivalency of the dicarboxylic acid component, and for purposes of expediting the reaction to obtain a product of low acid value, for example, 10 or below, or of increasing hydroxyl value, an excess of the sums of the alcohols, for example 5, 10 or even 200 percent (if the products are to be of high hydroxyl value) may be employed.

The polyesters may be made up solely from alcohols containing only two hydroxyls, or if desired, they may be made up solely from alcohols containing 3 or even more hydroxyls. The various intermediate proportions of the two alcohols are contemplated as being within the purview of the invention. At present mixtures of the two alcohols are preferred.

The mixtures of catalysts as herein disclosed are found to be quite efficacious in the preparation of polyesters in which the polyhydric alcohol component comprises a mixture in which the alcohol portion of the reaction mixture may contain from about 2 to 98 percent of the dihydric alcohol, the rest being the alcohol containing 3 or more hydroxyls. As previously stated, the alcohol portion may also be composed substantially entirely of either an alcohol containing two hydroxyls or one containing at least 3 hydroxyls. The preferred mixture presently comprises from about 2 to about 10 percent by weight based upon the mixture of alcohols of a primary polyol containing at least 3 hydroxyls, the rest being a primary diol.

The triaryl phosphite may be employed in an amount approximately within a range of 0.1 to 3 percent by weight based upon the reactive components of the mixture of dicarboxylic acid and polyhydric alcohol. The arylsulfonic acid, it is suggested, may be employed within a portion of about 0.005 to 3 percent upon a like basis.

For purposes of promoting the reaction by maintenance of fluidity in the reaction mixture and by azeotropically removing the water evolved by the reaction, it is often convenient to include in the reaction mixture a small amount of an inert or non-reactive diluent, such as xylene. Since this component is non-reactive, but is purely physical in its action, no definite amount need be employed so long as the reaction mixture is adequately fluid. Amounts of about 1 to 50 percent by weight based upon the mixture are ordinarily employed.

The time of reaction will vary, dependent upon the acid value desired in the product, but usually will extend within a range of about 6 to 14 hours with the optimum being approximately within the range of 8 to 10 hours.

Various embodiments of apparatus may be employed in conducting the reaction. That illustrated in the drawings is of the microplant size and comprises a round glass flask 10 provided with a heating jacket or other appropriate source of heat indicated at 11. This jacket is indicated as comprising leads 12 for a source of electrical current. The flask is shown as including necks 13, 14 and 15 which may be provided with sealing means, such as stoppers 17. The central neck 14 is provided with a conventional agitator or stirrer 18 driven in well known manner by motor 19. The neck 13 is indicated as being provided with a dropping funnel 21 for the introduction of liquids into the flask, and with temperature measuring means such as a thermometer 22.

Neck 15 is provided with a tube 23 having its discharge end below the surface of the liquids in the container and being connected to a source of inert gas such as carbon dioxide or combustion gases (not shown). This tube is employed for introducing inert gases into the flask to sweep out air and for purposes of assisting in the removal of water generated by the esterification reaction.

Neck 15 is further provided with an outlet tube 24 discharging vapors from the flask into a trap 26 which is of conventional design such as a well known Dean-Stark trap. The upper portion of the trap discharges into a condenser tube 27. The tube may be of the air condenser type or may be provided as illustrated in the drawings with a jacket 28 through which cooling fluid such as water is circulated by means of an inlet 29 and an outlet 31. Preferably, the condenser tube discharges to the atmosphere although, if desired, it could also be connected by a line 32 to a suitable source of vacuum for purposes of promoting the removal of water of reaction and solvents from the mixture.

In the operation of the apparatus as illustrated in the drawings, the polyhydric alcohol and polybasic acid are introduced into the flask and heated. The solvent (if one is employed) may be introduced at substantially the time of introduction of the two main reactive components, although it is permissible to introduce it at a later stage if so desired. The catalyst may be introduced simultaneously or separately at any desired stage in the reaction, or before the reaction begins.

The temperature in the flask is raised to such value as will cause the evolution of water of reaction (usually about 375° F. to 450° F.), the latter being swept out of the flask by the non-reactive diluent. If inert gas is introduced into the reaction mixture during the period of evolution of water, it also assists in sweeping out the latter. Blowing with inert gas is an optional feature.

The inert gas and the vapors from the reaction pass up the neck 15, out through the tube 24 into the top of the trap 26 and up into the condenser tube 27. In the latter, less volatile constituents condense out and run back into the trap 26. The main constituents in the mixture in the trap comprise water and inert solvent, and in case the solvent is xylene or other hydrocarbon of relatively low density, the water stratifies on the bottom and is drawn off through the outlet tube 33. The solvent in the upper portion of the trap passes back through the tube 24 and is discharged or returned to the flask 10. Possibly some more highly volatile constituents such as decomposition products may pass out of the condenser tube 27 and may be allowed to escape to the atmosphere or may be further treated to recover them if so desired.

The application of the principles of the invention is illustrated by the following examples.

EXAMPLE I

For purposes of demonstrating the value of combinations of p-toluenesulfonic acid and triphenyl phosphite as catalysts of esterification, the following esterifiable mixture is prepared in an apparatus substantially as disclosed in the drawings:

| | Moles |
|---|---|
| Adipic acid | 16 |
| Trimethylol ethane | 1 |
| Diethylene glycol | 17 |

Xylene (10 percent based upon the charge).

Run A

This is a control run. No catalyst is used. The mixture is heated as rapidly as practicable to evolve water, which is removed from the system by refluxing of the xylene. The temperature is maintained at about 220° C. Cooking is continued for 17.5 hours, at which time water has substantially ceased to evolve and an acid value of 1.81 is attained.

Run B

In this run, the mixture is the same as in Run A, but with 0.1 percent by weight based upon the charge, of p-toluenesulfonic acid as a catalyst. This is at or near the optimum as the amount of catalyst. The mixture is heated at 220° C. for 11 hours at which time the acid value has dropped to 1.98.

Run C

In this run triphenyl phosphite is added to the mixture as the sole catalyst. The charge comprises the same mixture as is employed in Run A, but with the addition of 0.5 percent by weight based upon the charge of adipic acid and alcohols, of triphenyl phosphite. The mixture is heated at 220° C. for 18½ hours by which time, an acid value of 2.02 is attained. The triphenyl phosphite in this instance, does not appear to have catalyzed the reaction, at least to any substantial degree.

Run D

This run is illustrative of the use of a combination of p-toluenesulfonic acid and triphenyl phosphite to catalyze the reaction. The reaction mixture is substantially the same as in Run A, but with the addition of 0.1 percent by weight based upon the charge, of adipic acid and alcohols, of toluenesulfonic acid and 0.5 percent by weight upon a like basis of triphenyl phosphite. The mixture is cooked at 220° C. for 9 hours, at the conclusion of which time, the acid value has dropped to 1.61. It will be apparent that the incorporation of the combination of toluenesulfonic acid and triphenyl phosphite into the charge materially shortens the cooking time and reduces the acid value of the polyester product as compared with mixtures catalyzed by either catalyst component taken singly and in any practicable amount.

For purposes of ease of comparison, the test data for Runs A, B, C and D are tabulated as follows:

| Run | Triphenyl Phosphite, Percent | p-toluene-sulfonic acids, Percent | Cooking Time | Acid Value |
|---|---|---|---|---|
| A | 0.0 | 0.0 | 17.5 | 1.81 |
| B | 0.0 | 0.1 | 11 | 1.98 |
| C | 0.5 | 0.0 | 18.5 | 2.02 |
| D | 0.5 | 0.1 | 9 | 1.6 |

The polyester of Run D is well cooked, of low acid value and is useful for various purposes; for example, it contains available hydroxyls and is well adapted to react with various isocyanates, such as tolylene diisocyanate, to form polyurethane resins and foams.

EXAMPLE II

In this example, xylene is employed as a reflux medium. The charge comprises:

| | |
|---|---|
| Adipic acid | pounds 35 |
| Diethylene glycol | do 28.6 |
| Trimethylol ethane | do 1.1 |
| Triphenyl phosphite | grams 147.0 |
| p-Toluenesulfonic acid | do 60.0 |
| Xylene | pounds 6.5 |

The apparatus substantially corresponds to that of the drawings.

The mixture is cooked at refluxing temperature for 8 hours and 40 minutes to provide a resin product useful for reaction with tolylene diisocyanate and other isocyanates to form polyurethane resins, either in the form of protective coatings, or foams.

What is claimed is:

1. A method of preparing a polyester which comprises forming a mixture consisting essentially of unesterified adipic acid and a mixture of unesterified diethylene glycol and unesterified trimethylolethane, the latter mixture being employed in a range of about 5 to 200% by weight in excess of equivalency with respect to the adipic acid, the trimethylolethane being present in the mixture in a proportion of about 2 to 10% by weight based upon the mixture of the two alcohols, adding to the mixture about 1 to 50% by weight based upon the total mixture of xylene, about 0.1 to about 3% by weight based upon the reactive components, of triphenyl phosphite and about 0.005 to about 3% by weight based upon the reactive components, of paratoluene sulfonic acid and heating the mixture at esterification temperature for about six to fourteen hours to evolve water and to form said polyester at an acid value below 10; esterification being conducted substantially throughout, in the presence of said paratoluene sulfonic acid and said triphenyl phosphite.

2. A method of preparing a polyester which comprises forming a mixture consisting essentially of an unesterified dicarboxylic acid selected from the group consisting of succinic acid, adipic acid, azelaic acid, sebacic acid and suberic acid, and a mixture of an unesterified glycol selected from the class consisting of ethylene glycol, diethylene glycol, triethylene glycol, trimethylene glycol and tetramethylene glycol, and a polyhydric alcohol selected from the class consisting of trimethylolethane, trimethylolpropane, pentaerythritol and glycerol, the latter mixture being employed in a range of about 5 percent by weight to about 200 percent by weight in excess of equivalency with respect to the dicarboxylic acid, the polyhydric alcohol being present in the mixture in a proportion of about 2 percent by weight to about 10 percent by weight based upon the mixture of the two alcohols, adding to the mixture about 1 percent by weight to about 50 percent by weight based upon the total mixture of xylene, about 0.1 percent by weight to about 3 percent by weight based upon the reactive components of triphenyl phosphite, and about 0.005 percent by weight to about 3 percent by weight based upon the reactive components of para-toluene sulfonic acid, and heating the mixture at esterification temperature for about 6 to 14 hours to evolve water and to form said polyester at an acid value below 10, esterification being conducted substantially throughout in the presence of said para-toluene sulfonic acid and said triphenyl phosphite.

3. A method of preparing a polyester which comprises forming a mixture consisting essentially of an unesterified dicarboxylic acid selected from the group consisting of succinic acid, adipic acid, azelaic acid, sebacic acid and suberic acid, and a mixture of an unesterified glycol selected from the class consisting of ethylene glycol, diethylene glycol, triethylene glycol, trimethylene glycol and tetramethylene glycol, and a polyhydric alcohol selected from the class consisting of trimethylolethane, trimethylolpropane, pentaerythritol and glycerol, the latter mixture being employed in a range of about 5 percent by weight to about 200 percent by weight in excess of equivalency with respect to the dicarboxylic acid, the polyhydric alcohol being present in the mixture in a proportion of about 2 percent by weight to about 10 percent by weight based upon the mixture of the two alcohols, adding to the mixture about 0.1 percent by weight to about 3 percent by weight based upon the reactive components of triphenyl phosphite, and about 0.005 percent by weight to about 3 percent by weight based upon the reactive components of para-toluene sulfonic acid, and heating the mixture at esterification temperature for about 6 to 14 hours to evolve water and to form said polyester at an acid value below 10, esterification being conducted substantially throughout in the presence of said para-toluene sulfonic acid and said triphenyl phosphite.

References Cited in the file of this patent

UNITED STATES PATENTS

| 2,437,046 | Rothrock | Mar. 2, 1948 |
| 2,437,232 | Rothrock | Mar. 2, 1948 |
| 2,801,189 | Collier | July 30, 1957 |

FOREIGN PATENTS

| 588,833 | Great Britain | June 4, 1947 |